Feb. 15, 1927. 1,617,786
H. AUSTIN
SPOKED WHEEL OF METAL
Original Filed Sept. 29, 1924
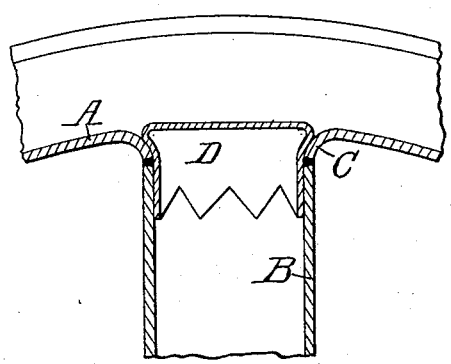
Inventor:
Herbert Austin
By J. H. Clarkson
Att'y Patented Feb. 15, 1927.

1,617,786

UNITED STATES PATENT OFFICE.

HERBERT AUSTIN, OF BROMSGROVE, ENGLAND.

SPOKED WHEEL OF METAL.

Original application filed September 29, 1924, Serial No. 740,585, and in Great Britain June 28, 1924. Divided and this application filed August 31, 1925. Serial No. 53,686.

This invention relates to sheet metal spoked wheels having spokes formed from sheet metal or sheet metal tubing, and is a division of my pending application, Serial No. 740,585 filed Sept. 29, 1924, and has for its object to provide improved means by which the outer ends of the spokes are secured to the rim.

According to the invention, the outer ends of the spokes are butted up to the inner ends of sockets formed on the inner periphery of the rim, and this may be effected by punching suitable holes in the rim and pressing in the edges of the holes to form the sockets. Metal ferrules, preferably with closed outer ends are pressed into the sockets and extend a short distance into the outer ends of the spokes. The spokes are then secured at their outer ends to the sockets and to the ferrules by welding, the welding metal entering the crevices between such outer ends and the inner ends of the sockets and joining them up to the respective ferrules.

An embodiment of the invention is illustrated in the drawing herewith which shows a section of the outer end of a spoke and its connection to the rim of the wheel, the section being taken in the mid-plane of the wheel. The inner end of the spoke is connected to the hub in any desired manner (not shown).

In these drawings:—A is the wheel rim and B one of the spokes. The rim A is drilled or punched at positions where the outer ends of the spokes B are to be joined thereto, and the edges of the holes are pressed inwards to form short sockets C against which the outer ends of the spokes B are butted up; but a slight space is preferably left between the sockets and the ends of the spokes. Closed ended ferrules D are pressed into the sockets and extend a short distance into the spoke ends.

The wheel, when assembled, is welded up by autogenous or electric welding, the welding metal being run into the spaces left between the outer ends of the spokes B and the inner edges of the sockets C thus securing the spokes to the sockets and to the ferrules D. The inner ends of the spokes are secured to the hub in any desired manner.

Having fully described my invention what I claim and desire to secure by Letters Patent is:—

In a spoked wheel of sheet metal, a rim, a short socket extending inwardly from the rim, a tubular spoke having its outer end butting up against the inner end of the socket, and a ferrule passing through the socket and into the outer end of the spoke, the spoke being secured to the ferrule by welding material run into the crevice between the outer end of the spoke and the inner end of the socket, said ferrule being closed at its outer end.

In witness whereof I have hereunto signed my name this twelfth day of August, 1925.

HERBERT AUSTIN.